United States Patent [19]

Peterson

[11] 4,275,436
[45] Jun. 23, 1981

[54] CONVERTER BLEEDER CIRCUIT RESPONSIVE TO FLUX CONDITION OF FILTER INDUCTOR

[75] Inventor: William A. Peterson, Hanover Township, Morris County, N.J.

[73] Assignee: Bell Telephone Laboratories, Incorporated, Murray Hill, N.J.

[21] Appl. No.: 62,706

[22] Filed: Aug. 1, 1979

[51] Int. Cl.³ .............................................. H02M 1/14
[52] U.S. Cl. .................................... 363/47; 363/126; 323/223; 323/286
[58] Field of Search ................................... 363/45–47, 363/126; 323/8, 17, 23, 25, 22 T, DIG. 1

[56] References Cited

U.S. PATENT DOCUMENTS

| 2,214,773 | 9/1940 | Overbeck | 363/47 |
| 2,418,114 | 4/1947 | Frankel | 363/47 |
| 3,351,848 | 11/1967 | Lodder | 323/22 T |

OTHER PUBLICATIONS

C. K. Fitzsimmons, "Transistor Replaces Bleeder and Regulates Power Supply", Jan. 22, 1968, Electronics, vol. 41, No. 2, pp. 70–71.
W. J. Hirschberg, "Optimizing the Muti-Output Switcher", May 12–14, 1977, Proceedings of Powercon 4/Boston, pp. E3-1–E3-5.

Primary Examiner—William M. Shoop
Assistant Examiner—Peter S. Wong
Attorney, Agent, or Firm—Alfred G. Steinmetz

[57] ABSTRACT

A bleeder circuit is utilized to insure proper operation of a filter inductor in a pulsed power system. A control arrangement couples a bleeder resistor to the filter inductor in response to actual current discontinuities in the inductor. The control arrangement responds to actual current discontinuities by responding to a voltage collapse in the inductor and activates a switch to couple the bleeder resistor to the inductor.

5 Claims, 2 Drawing Figures

CONVERTER BLEEDER CIRCUIT RESPONSIVE TO FLUX CONDITION OF FILTER INDUCTOR

FIELD OF THE INVENTION

This invention is concerned with bleeder arrangements for pulsed power systems and in particular is concerned with a bleeder circuit responsive to actual current discontinuities in the output filter of a converter type power supply.

BACKGROUND OF THE INVENTION

Pulsed power systems providing a rectified DC output normally utilizes LC low-pass filters to smooth out the irregularities of the rectified pulse signals. If the filter inductance value is too low or the load resistance is too high, the inductor current may become discontinuous. Upon the occurrence of this discontinuity, the inductor ceases to function as part of the low-pass filter and the capacitor of the filter takes precedence, thereby detecting a peak voltage instead of averaging out the irregularities of the rectified signal. To counter these effects of discontinuous current, bleeder circuits are normally coupled to the inductor in order to establish a minimum continuous load current.

Conventional bleeder circuits utilized to insure proper operation of an inductive filter in a pulsed power system are generally a source of unnecessary dissipation in the circuit since the bleeder circuit either operates continually or is connected to the inductor at a fixed signal threshold value which may not relate to the actual energy state of the inductor. In many instances the sensing of the threshold signal itself is a source of power dissipation. For example, arrangements to sense the filter inductor current dissipate significant amounts of power.

BRIEF SUMMARY OF THE INVENTION

Therefore, in accordance with the principles of this invention, a control arrangement to enable bleeder action or connect a bleeder to the filter inductor operates in response to actual current discontinuities in the filter inductor. This control arrangement eliminates unnecessary power dissipation and permits the utilization of a smaller inductor to improve the transient response of the output filter. In a particular embodiment, current discontinuities are detected by responding to a voltage collapse in the inductor due to a current discontinuity. Control circuitry responsive to this voltage collapse activates a switch to couple a bleeder circuit to the inductor filter. This arrangement advantageously and significantly reduces power dissipation in both the bleeder circuit and the associated control circuit.

BRIEF DESCRIPTION OF THE DRAWINGS

The principles of the invention may be readily understood by referring to the following description in combination with the drawing wherein.

DETAILED DESCRIPTION

Figure 1:
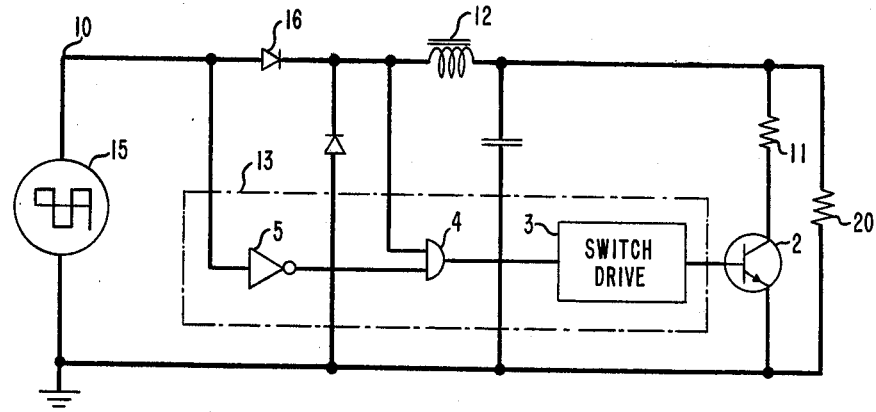
FIG. 1 is a schematic and block diagram of a bleeder connecting circuit arrangement according to the principles of the invention.

A bleeder circuit connecting arrangement disclosed in FIG. 1 is responsive to current discontinuities in a filter inductor 12. It utilizes a control circuit 13 responsive to a voltage collapse in inductor 12, indicating a complete dissipation of stored energy in the inductor. This control circuit 13 biases a transistor 2 conducting in order to couple a bleeder resistor 11 to the filter inductor 12 at the moment a discontinuity occurs in the current flowing through filter inductor 12. As shown in FIG. 1, input terminal 10 is connected to a pulsed power source 15 which may comprise a DC-to-AC converter circuit. The pulsed power source output is transmitted via a rectifying diode 16 through a filter inductor 12 to a load shown as load resistor 20. If the inductance of inductor 12 is low or the impedance of the load resistor 20 is very high, the energy stored in inductor 12 due to one power pulse may be completely dissipated before the application of a subsequent power pulse.

A bleeder resistor 11 is utilized according to the principles of the invention to provide an additional current path in order to maintain continuous current flow through the filter inductor 12. Bleeder resistor 11 is connected to inductor 12, in order to create a current sink by biasing the switching transistor 2 into a conducting state. The impedance of bleeder resistor 11 is selected to maintain the minimum current necessary to maintain the desirable filtering properties of inductor 12. As indicated hereinabove, any current drawn by the bleeder resistor 11 in excess of the necessary minimum current represents an unnecessary power loss.

In accord with the invention, the transistor switch 2 is accurately controlled in order that the bleeder resistor 11 draw only the necessary minimum current. The conductive state of transistor switch 2 is controlled in response to a switch drive circuit 3 which generates driving pulses which are applied to the base of transistor switch 2. Switch drive circuit 3 is responsive to the output of an AND gate 4. AND gate 4 has its two inputs coupled to the output of the pulsed power source 15, via an inverter 5, and to the output of rectifying diode 16 connected to inductor 12.

The invention may be best understood by describing the operation of the bleeder control circuit shown in FIG. 1. The voltage signal input at the input terminal 10 is shown by voltage waveform a in FIG. 2 and ideally comprises a voltage square wave as shown. This voltage waveform a is rectified by the rectifying diode 16 resulting in the rectified voltage waveform b shown in FIG. 2. As indicated hereinabove, it is necessary to maintain continuous current in the filter inductor in order to maintain its filtering action.

Figure 2:
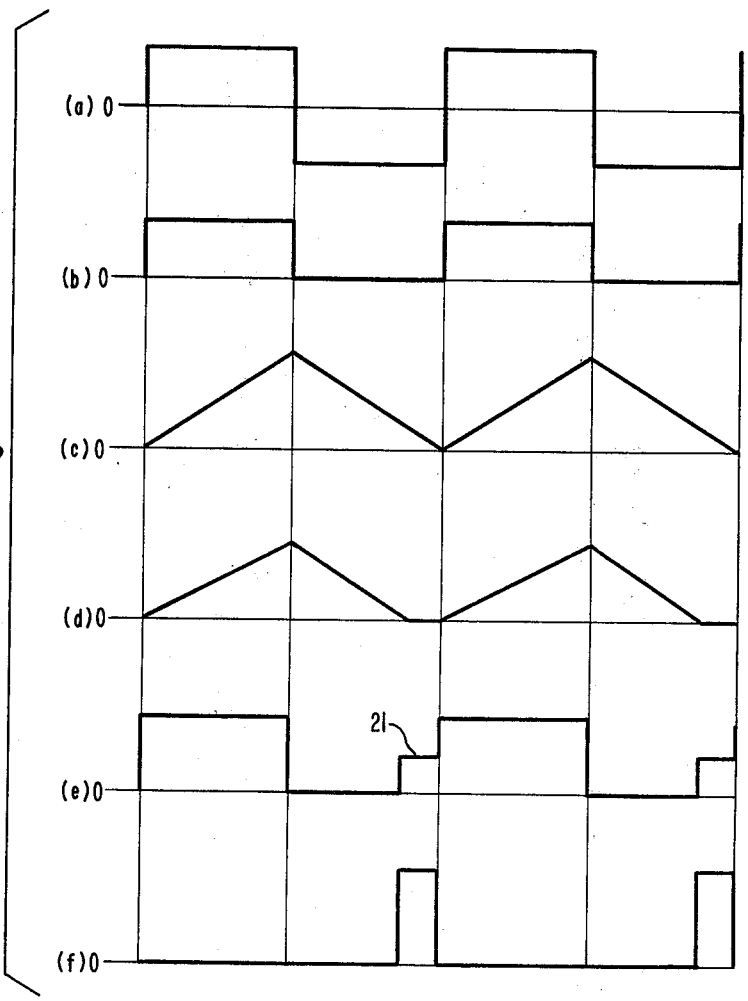
FIG. 2 discloses voltage and current waveforms to assist in an explanation of how the circuit of FIG. 1 operates.

A typical minimum continuous current state in the inductor 12 is shown by current waveform c in FIG. 2 and it is apparent by inspection that the current flow therein is continuous; that is, an increase in inductor current begins as soon as a decrease has terminated.

A second current waveform d as shown results from a discontinuous current condition in the inductor 12. This current discontinuity causes the inductor current to drop to zero and, with the dissipation of stored energy, inductor 12 loses its filtering action. The resulting voltage at the junction of rectifying diode 16 and inductor 12 in response to a current discontinuity in the inductor 12 is shown by pulse step 21 in voltage waveform e in FIG. 2. Input voltage waveform a is transmitted to AND gate 4 via an inverter 5. The output voltage waveform e of the rectifying diode 16 is applied uninverted to the other input of the AND gate 4. As soon as the current in the inductor 12 becomes discontinuous, the inverted input waveform and the pulse step 21 are both of the same polarity and enable the AND gate 4. This results in the output pulse signal of AND gate 4 shown by waveform f in FIG. 2. This pulse signal is applied to the switch drive circuit 3 which may be a schmidt trigger or equivalent. The output of switch drive circuit 3 biases the switching transistor 2 into a conducting state thereby completing the bleeder current path. Current flows from the filter inductor 12 through bleeder resistor 11 preventing discontinuity of current in inductor 12. By making the gain of control circuit 13 sufficiently high, the actual duration of the discontinuity sensed is negligible and the bleeder current sink operates rapidly enough to maintain the inductor current substantially continuous.

Since the bleeder control transistor 2 is switched on and off in response to actual occurrences of discontinuity in the filter inductor 12 and the control circuit 13 has sufficiently high gain to respond very rapidly, it is apparent that the dissipation of the bleeder resistor 11 is limited to exactly the minimum bleeder current required to maintain a continuous inductor current. The bleeder resistor 11 draws only the actual current required in order to keep the inductor filter properly operating in a continuous current mode.

Many other methods of embodying this principle will be apparent to those skilled in the art without departing from the spirit and scope of this invention.

I claim:

1. A bleeder control arrangement operative to maintain current continuity in a filter inductor energized by a pulsed power source comprising
rectifying means coupling a periodic pulse signal of the pulsed power source to the filter inductor, a bleeder resistor, switching means for coupling the bleeder to the filter inductor
control means responsive to a voltage collapse in the filter inductor and operative to enable the switching means, said control means including inverting means for inverting the periodic pulse signal and coincidence gate means responsive to an output of the inverting means and the rectifying means and coupled to drive the switching means.

2. A bleeder control arrangement as defined in claim 1 wherein the control means includes drive means responsive to the coincidence gate to enable the switching means.

3. A pulsed power system comprising
rectifying means and inductive means for filtering a ripple signal output of the rectifying means, and bleeder means selectively coupled to the inductive means for drawing a current through the inductive means, wherein the improvement comprises
switching means for selectively coupling the bleeder means to the inductive means
discontinuity sensing means for detecting a current discontinuity in the inductive means including first means for inverting a periodic signal applied to an input of the rectifying means, second means for sensing an output signal of the rectifying means, and coincidence gate means responsive to the first and second means and
drive means responsive to the discontinuity sensing means for activating the switching means and enabling current conduction through the bleeder means.

4. A pulsed power system as defined in claim 3 wherein the improvement comprises
said switching means including a switching transistor in series with the bleeder means and bias circuitry for biasing the switching transistor in response to the coincidence gate.

5. A pulsed power system as defined in claim 4 wherein the improvement comprises
said bleeder means including a resistor connected in series with the switching transistor, the series connected switching transistor and resistor connected in parallel with a load impedance energized by said pulsed power system.

* * * * *